2 Sheets—Sheet 1
O. HEIKEL.
Magneto-Electric Machines.
No. 219,398.  Patented Sept. 9, 1879.
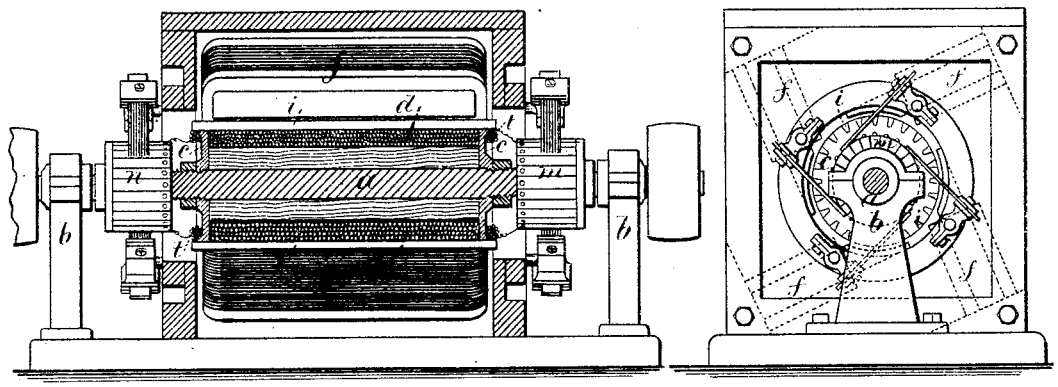
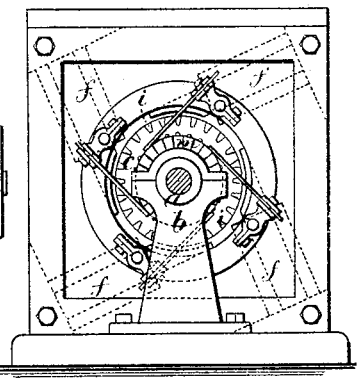
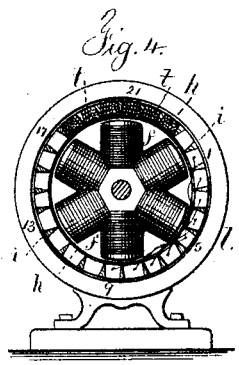
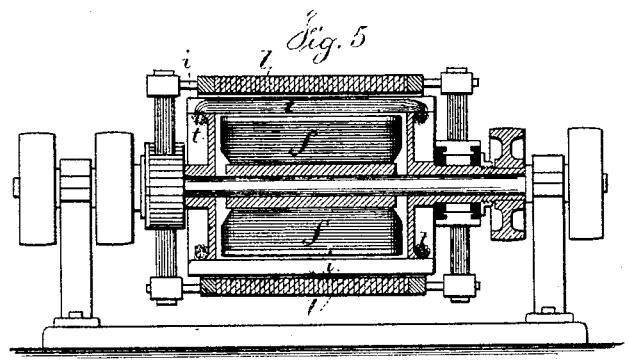
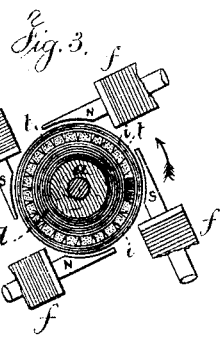
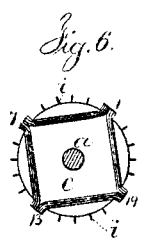
Witnesses,
Chas. H. Smith
Geo. T. Pinckney
Inventor
Otto Heikel
per Lemuel W. Serrell
Atty.

2 Sheets—Sheet 2.
O. HEIKEL.
Magneto-Electric Machines.
No. 219,398. Patented Sept. 9, 1879.
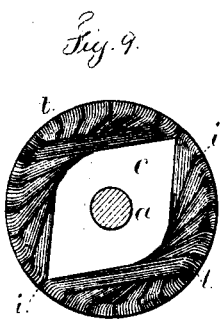
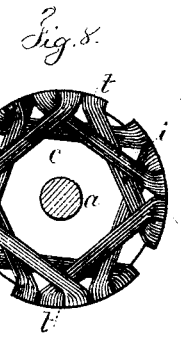
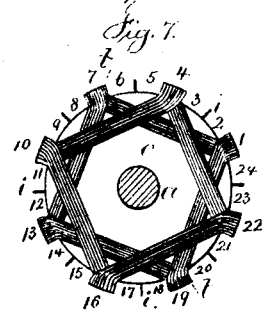
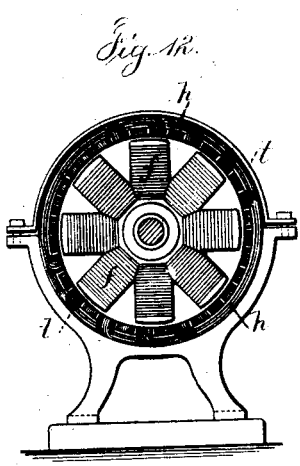
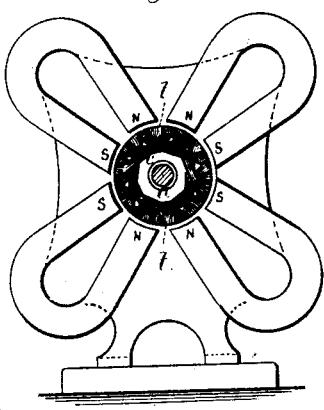
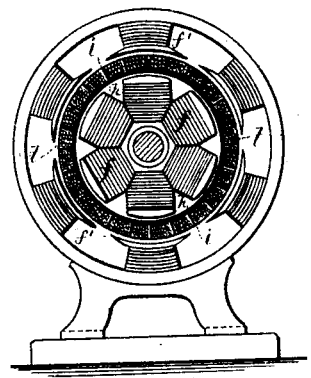
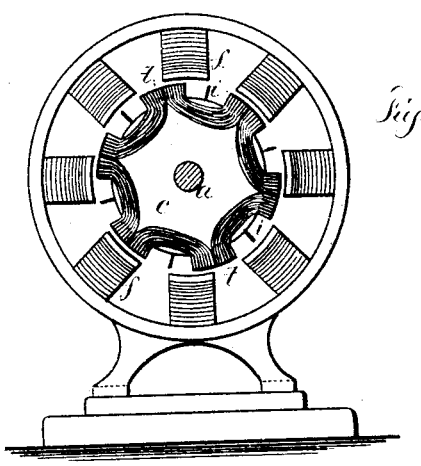
Witnesses
Chas. H. Smith
Geo. T. Pinckney
Inventor
Otto Heikel
per Lemuel W. Serrell
Atty
N. PETERS, PHOTO-LITHOGRAPHER, WASHINGTON, D.C.

UNITED STATES PATENT OFFICE.

OTTO HEIKEL, OF JERSEY CITY, NEW JERSEY.

IMPROVEMENT IN MAGNETO-ELECTRIC MACHINES.

Specification forming part of Letters Patent No. 219,398, dated September 9, 1879; application filed November 14, 1878.

*To all whom it may concern:*

Be it known that I, OTTO HEIKEL, of Jersey City, in the county of Hudson and State of New Jersey, have invented an Improvement in Magneto-Electric Machines, of which the following is a specification.

Magneto-electric machines have been made with the helices, in which the secondary or induced current is set up, wound longitudinally of the revolving shaft, and in which the helix is moved across the magnetic field of the stationary magnet.

The object of my invention is to obtain the greatest amount of secondary or induced current within a limited space, so as to lessen the weight of the machine and promote its efficiency.

I provide any four or more of field-of-force magnets, and I wind the helices longitudinally and from one longitudinal range to another until a complete helix is made up, having numerous longitudinal ranges or sections properly located relatively to the field-of-force magnets, and the wires at the ends where they cross from one range to the next usually form a polygon, and the number of the complete helices is increased to whatever extent there may be room in the machine.

If the helices are stationary the current may be taken off direct or through a commutator for an electric light or for any electric operation, and the wires that are of the same polarity at the same time may be grouped together; but where the helices revolve the current is to be taken off by commutators of suitable character, so as to produce one or more continuous currents, or currents of alternate polarity.

In the drawings, Figure 1 is a section longitudinally of a machine in which the helices revolve. Fig. 2 is an end view, representing the field-of-force magnets by dotted lines and the commutators. Fig. 3 is a section representing the tangential positions of the field-of-force magnets. Fig. 4 is a cross-section; and Fig. 5 is a longitudinal section, showing the field-of-force magnets as revolving and the secondary-current helices as stationary. Figs. 6, 7, 8, 9 represent the manner in which the complete helices are wound, and the other figures are separately referred to.

The shaft $a$ is supported in suitable bearings $b$ and revolved by power. The heads $cc$ inclose the cylinder $d$, that is of iron. It is composed, by preference, of rings, or of insulated wire wound helically; but it may be a plain iron cylinder.

When helices of wire are used each helix should be commenced at the same end, so that the wires lie closely together.

If the helices were wound from first one end and then the other, the direction of the helices would not correspond, and the wires of one helix would not lie in the grooves between the wires of the inner helix, and the cylinder of wire would not be compact. By winding the helices all in the same direction the coils of one lie in the groove between the coils of the other throughout the entire cylinder.

Along the surface of the cylinder $d$ there are, preferably, plates $i$, of brass, wood, or other suitable material, standing radially and secured to the heads $c$. The ends of these plates $i$ project beyond the heads, or else the heads are made with such projections. Helices $t$ are wound between these plates $i$, as hereinafter described.

Four field-of-force magnets, $f$, are placed around the revolving portion of the machine, as shown in Figs. 2 and 3, their positions being, by preference, tangential, and the poles alternating, N S, as shown.

The helices $t$ revolve in the direction shown in Fig. 3, and hence the secondary currents are attenuated and prolonged, instead of being abrupt, as usual in magneto-electric machines where the core is flat at the end.

These field-of-force magnets may be permanent or electro magnets, and energized in any suitable manner.

If electro-magnets are employed a portion of the secondary currents may be led through the helices, so as to energize the same to the maximum capacity.

In all cases the field-of-force magnets should be as broad as the helix-sections are long, and their extreme ends should be curved slightly, so as to prevent the electric action being abrupt.

In winding the helices $t$, I proceed as illustrated in Fig. 6, the number of longitudinal channels around the cylinder $d$ being a multiple of the field-of-force magnets, and I wind through as many grooves as there are field-of-force magnets, such grooves being equidistant from each other. Twenty-four grooves are shown in Fig. 6. I lay a wire in the first groove, then go across the end $c$ to the seventh groove and back to the first groove, and so on, winding the grooves about half-full, and forming one helix-section. Then I wind from the seventh to the thirteenth groove in the same manner, and then from the thirteenth to the nineteenth groove, and from the nineteenth to the first groove, forming four sections, and constituting what I term a complete helix, and the ends of the wires are taken off from each section of the helix to commutators or otherwise. The wires that cross the ends or heads $c$ in this case form a square. I then wind the helices in the fourth, tenth, sixteenth, and twenty-second grooves in the same manner as illustrated in Fig. 7 to form the next complete helix, and then the third complete helix is wound in the third, ninth, fifteenth, and twenty-first grooves; and so on I proceed until the whole of the grooves are filled. I now have six complete helices, each composed of four sections and four field-of-force magnets.

All the coils in one helix reach the culminating point at the same time, and the rise, fall, and reversal of electric energy in each complete helix as it passes from one field-of-force magnet to the next are simultaneous, and the helices being carried bodily across the field of magnetic energy have the secondary or induced current set up to its maximum capacity, and with the machine shown in Figs. 1, 2, and 3 this secondary current will be set up twenty-four times in a complete revolution of the helix-cylinder.

It will be apparent that when the longitudinal wires of one helical section are influenced by a north pole of the magnet the other longitudinal wires are influenced by the south poles, so that the circulation of current through the section will be of the greatest electric energy. The same effect is produced when the field-of-force magnets revolve and the helices are stationary.

I have represented in Figs. 4 and 5 an arrangement of helical sections in which the field-of-force magnets $f$ are upon a shaft that revolves within a cylinder composed of helical sections $t$, made up substantially as before described. The cylinder $h$ is divided up longitudinally into sections by the plates $i$, the number of which is a multiple of the number of field-of-force magnets, and the wire of each sectional helix passes along in front of the north pole, (when at rest,) returning in front of the south pole, and the complete helix is composed of the same number of sections as there are field-of-force magnets. Thus, in Fig. 4, the sections will be wound in the grooves 1 and 5, 5 and 9, 9 and 13, 13 and 17, 17 and 21, 21 and 1, thus making up a complete helix composed of six sections, and the intermediate sections are wound in the same order. Around outside these helices there is a cylinder, $l$, of iron. It may be of one, solid, or composed of rings or a helix of wire.

In a machine constructed in this manner the interior field-of-force magnets may remain stationary and the cylinder of helices be revolved.

In large-sized machines, to obtain the best effect, care is to be taken to wind the longitudinal wires of the sectional helices so as to bring the same accurately in the position to arrive at the magnetic culminating-points of N and S at the same moment.

With this object in view some of the helix-sections $t$ will lap or cross the wires of the previous section at the angles, as indicated in Figs. 8 and 9, so that the distance apart of the wires in each helix-section and the centers of the field-of-force magnets may correspond exactly.

The wires may be wound singly, or two or more wires may be wound at the same time, or successively, so that each helix-section is composed of one, two, or more parts, from which the connections can be taken either to a commutator or to the electric circuit of an electric light, plating-battery, or other electric device.

The commutators $m$ and $n$ and their springs or rubbers are to be of any desired character, and the connections with the helices are made with reference to intensity or quantity, or to the production of continuous or alternate currents.

In Fig. 10 the helices $t$, wound into cylindrical form, and composed of the sections aforesaid, are represented as revolving between four permanent magnets, the poles of which are placed in pairs, as shown, so as to prolong the induced or secondary current in the helices. When electro-magnets are used in place of these permanent magnets, three or more north poles may be grouped together, and then three or more south poles for the same purpose, of prolonging currents in the helices.

In Fig. 11 the machine is represented with the internal field-of-force magnets, $f$, and external field-of-force magnets, $f'$, stationary, and with the cylinder $h$ of the helix-sections $t$, wound as aforesaid, revolving between the poles of such magnets and crossing the magnetic field.

In Fig. 12 a magneto-electric machine is represented with revolving field-of-force magnets $f$ within a cylinder of helices, the same as those shown in Fig. 4, with the exception that the cylinder $h$ is outside the longitudinal helix-coils $t$, and the dividing-plates project at the ends of such cylinder, in order that the wires, where they cross from one helix-section to the next, may be outside and pass across these projecting plates, so as to draw the longitudinal wires into the grooves at the inside of the cylinder.

Fig. 13 is introduced to illustrate the fact that the longitudinal helix-sections $t$ may be wound as aforesaid, but not be a multiple of the number of field-of-force magnets. In this case the secondary current will be more gradually induced than in cases where the culminating-points correspond.

Fig. 14 represents a cylinder of helices like that in Fig. 8, but with all the helix-sections.

Fig. 15 represents five helix-sections as wound to cross at the ends.

Fig. 16 represents three helix-sections wound so that the wires of one complete helix do not cross each other at the ends.

Fig. 17 represents the complete cylinder, Fig. 16, with the second range of helix-sections.

In Figs. 18 and 19 the wires of the helix-sections are represented as crossing each other, as in Fig. 8, and for the same purpose.

I am aware that a revolving armature has been made with one helix in which the wires run longitudinally at opposite ends.

I claim as my invention—

1. In a magneto-electric machine containing four or more field-of-force magnets around a cylinder, the helices wound longitudinally of that cylinder in sections corresponding in position to the field-of-force magnets, so that the wires of one helix pass in one direction contiguous to one pole of one magnet, and in the other direction contiguous to the other pole of that magnet, and at the ends of the cylinder the wires of the helix cross polygonally as cords, substantially as described and shown.

2. In a magneto-electric machine, a circular range of field-of-force magnets, each of which occupies a corresponding tangential position, and the end of the core is tapering, in combination with the revolving cylinder of armatures and helices within such circular range, substantially as set forth.

3. In a magneto-electric machine, the combination, with a cylinder of armatures and helices, of a range of field-of-force magnets in which two or more north poles are adjacent to each other, but do not touch, and two or more south poles, alternating with the two north poles, are contiguous to each other, but do not touch, substantially as set forth.

4. In a magneto-electric machine, the cylinder $d$, of wire wound of successive layers, each helix commencing at the same end and wound compactly into the groove of the previous helix, substantially as set forth.

Signed by me this 11th day of November, A. D. 1878.

OTTO HEIKEL.

Witnesses:
GEO. T. PINCKNEY,
CHAS. H. SMITH.